Nov. 14, 1961 W. J. MARKS 3,008,170
WATER DISTRIBUTION MEANS FOR VEHICLE WINDSHIELD WASHERS
Filed July 28, 1958

Witness
Edward P. Seeley

Inventor
William J. Marks
by M. Talbert Dick
Attorney

United States Patent Office 3,008,170
Patented Nov. 14, 1961

3,008,170
WATER DISTRIBUTION MEANS FOR VEHICLE WINDSHIELD WASHERS
William J. Marks, 1919 48th St., Des Moines, Iowa
Filed July 28, 1958, Ser. No. 751,405
2 Claims. (Cl. 15—250.04)

This invention relates to vehicle windshield washers and particularly to a means for more effectively distributing the water onto the windshield.

For several years now most automobiles, trucks and the like have been equipped with a water ejection means which when used in conjunction with the windshield wipers, serves to eradicate foreign matter from the windshield. Such devices usually consist of a nozzle extending through the vehicle body forward of the windshield and when the water is ejected therethrough, it is directed rearwardly and upwardly in the general direction of the windshield. This operation is quite often not successful. If the vehicle is traveling at high speed, the stream of water may well miss the windshield. Strong side winds also seriously affect the proper application of the water onto the windshield. However, the chief objection is that the stream of water is spotted at one point only on the windshield, and must be spread over the windshield by the wiper. Obviously, the spreading of the water is not efficient. Also, the wiper arm must swing through the stream of water as it moves in both directions, and this action knocks much water laterally which is wasted, inasmuch as it never reaches the windshield. Furthermore, the water is in the form of a stream rather than a spray. A further objection to the present type of washers is that they become clogged and are difficult to keep clean and open.

Therefore, one of the principal objects of my invention is to provide a water applying means for vehicle windshield washers that discharges the water in movement along with the reciprocating movement of the windshield wiper.

A further object of this invention is to provide a water applicator for vehicle windshield washers that sprays the water onto the windshield instead of ejecting it onto the windshield in a stream.

A still further object of this invention is to provide a water applicator for vehicle windshield washers that may be easily and quickly installed on the windshield wiper.

A still further object of this invention is to provide a water applicator that may be easily unclogged of foreign matter.

Still further objects of my invention are to provide a water applicator means for vehicle windshield washers that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Most vehicles have two windshield wipers and therefore two of my devices will be used. Inasmuch as each unit will be a duplicate of the other, I will only explain one installation.

Figure 1:
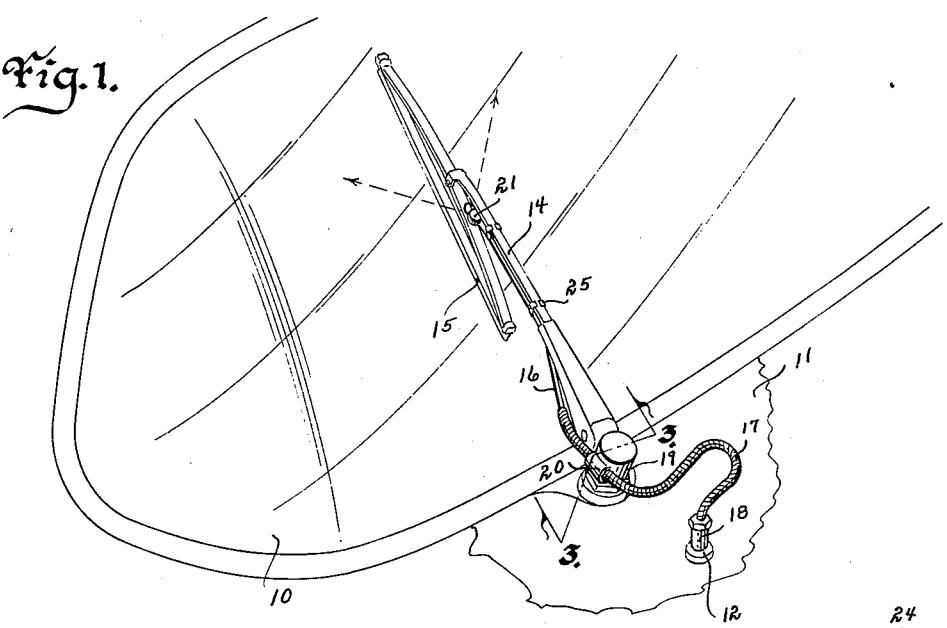
FIG. 1 is a perspective view of my device installed and ready for use.
Figure 2:
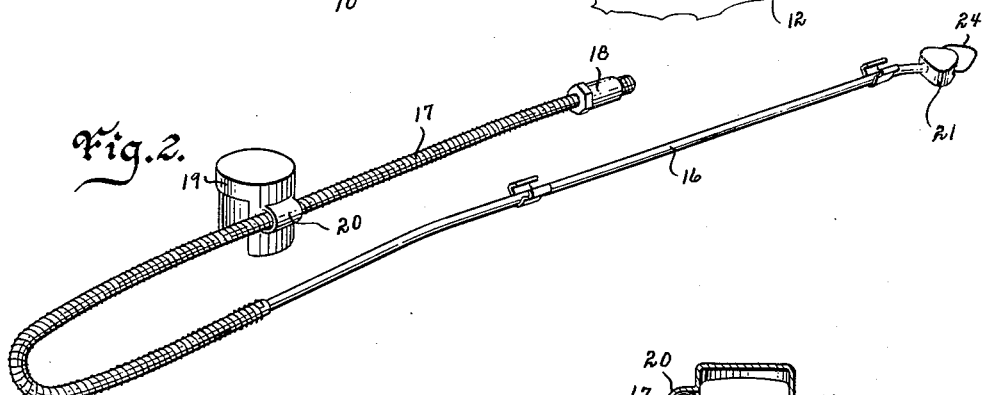
FIG. 2 is an enlarged perspective view of my water applicator prior to installation.
Figure 3:
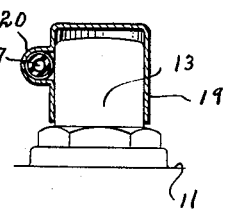
FIG. 3 is an enlarged vertical sectional view of a portion of the device taken on line 3—3 of FIG. 1.

In the drawings I have used the numeral 10 to designate the windshield of a vehicle. Forward of the windshield and extending through the vehicle cowling 11, is the water stud 12. This water stud is in communication with a water pump means (not shown). These studs have a nozzle threaded into their tops. The numeral 13 designates the reciprocating rotary stub base of the windshield wiper. The numeral 14 designates the wiper arm extending from the stub base 13. The upper end portion of the arm is in the form of a spring strap as shown in FIG. 1. The numeral 15 designates the wiper blade secured to the wiper arm.

The structure thus far described is standard and in common usage. It is to such wiper and water supply means that I install my device and which I will now describe in detail.

I have used the numeral 16 to designate an elongated pipe. Secured on the rear end of this pipe and communicating with the inside of the same is a flexible cable pipe 17. On the rear end of the flexible pipe 17 and communicating with the inside of the same is a threaded fixture 18.

The numreal 19 designates a cap or clip having a side loop 20, embracing the flexible pipe 17.

Figure 4:
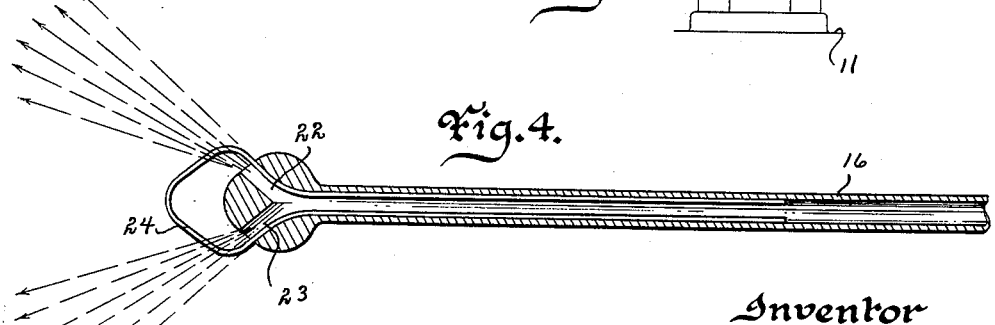
FIG. 4 is an enlarged longitudinal sectional view of the nozzle end portion of the device.

On the forward end and communicating with the inside of the pipe 16 is a water distribution head 21 having two exit bores 22 and 23, as shown in FIG. 4; these two bores 22 and 23 extend forwardly and outwardly away from each other. The numeral 24 designates a flexible large headed spring U-rod member having its two end portions detachably extending into the bores 22 and 23 and into the pipe 16. The numeral 25 designates a plurality of strap clamps, soldered or like secured at their centers to the pipe 16. To install my device, it is merely necessary to unscrew and remove the usual nozzle from the water stud 12, snap the collar cap 19 onto the wiper base 13, and clinch the strap clamps 25 around the flat strap portion of the wiper arm 14 with the pipe 16 resting directly under the wiper arm as shown in FIG. 1. The clinching of the clamps 25 may be accomplished by the use of a pair of pliers. The installation only takes a moment. The flexible pipe 17 permits unhampered movement of the wiper arm. When the water is introduced under pressure to the stud 12, it will flow through the pipes 17 and 16, thence through the exit bores of the head and be directed to each side respectively of the wiper blade as illustrated by broken arrows in FIG. 1. The water exiting from the bores 22 and 23 will not be in the undesirable form of a stream, but will strike the head area of the U-rod member 24 and will thereby be broken up into two spray columns as shown by broken arrows in FIG. 4. The exiting water will both precede and follow the wiper blade in both directions of its movement.

If the pipe 16 or its head 21 becomes stopped up by foreign matter, the same may be easily and quickly cleared by manually reciprocating the U-rod 24.

Some changes may be made in the construction and arrangement of my water distribution means for vehicle windshield washers without departing from the real spirit and porpose of my invention, and it is my intention to cover by my claims, any modified forms of structure or use of mechanical equivalents which may be reasonably included within their scope.

I claim:

1. In combination with a vehicle having a windshield, a source of liquid supply under pressure, and a windshield wiper including a base housing, a wiper arm extending from said base housing, and a wiper blade on said arm, a liquid distributing means, comprising, a conduit having at least a portion of its length flexible and in communication with said source of liquid supply; said conduit having a head member on its outer end; said head having two divergent exit bores in its outer end portion, a clamp means on said conduit securing said conduit to said wiper arm, and a detachable U-rod member having its two free end portions extending into the two exit bores respectively of said conduit.

2. In combination with a vehicle having a windshield, a source of liquid supply under pressure, and a windshield wiper including a base housing, a wiper arm extending from said base housing, and a wiper blade on said arm, a liquid distributing means, comprising, a conduit having at least a portion of its length flexible and in communication with said source of liquid supply; said conduit having a head member on its outer end; said head having two diverging exit bores in its outer end portion, a clamp means on said conduit securing said conduit to said wiper arm, and a detachable U-rod member having its two free end portions extending into the two exit bores respectively of said conduit; said U-rod member having its center formed into an expanded head portion and forward of the two bores of said conduit; said two bores extending forwardly and away from each other.

References Cited in the file of this patent

UNITED STATES PATENTS

| | | |
|---|---|---|
| 890,044 | Godbey | June 6, 1908 |
| 1,656,473 | Darlington | Jan. 17, 1928 |
| 2,632,911 | Deibel | Mar. 31, 1953 |
| 2,763,023 | Horton | Sept. 18, 1956 |
| 2,866,996 | Krusche | Jan. 6, 1959 |

FOREIGN PATENTS

| | | |
|---|---|---|
| 526,743 | Canada | June 19, 1956 |
| 940,138 | France | May 10, 1948 |